United States Patent [19]

Lavaggi

[11] 3,799,598

[45] Mar. 26, 1974

[54] APPARATUS FOR REMOVING FECES OF ANIMALS AND METHOD OF MANUFACTURE OF SAID APPARATUS

[76] Inventor: Robert Lavaggi, R.D. 1 - 300A Glassco Tpk., Woodstock, N.Y. 12498

[22] Filed: Mar. 29, 1972

[21] Appl. No.: 239,018

[52] U.S. Cl. ............... 294/19 R, 294/1 R, 294/50.8
[51] Int. Cl. ............................................. A47f 13/08
[58] Field of Search........ 294/1 R, 19 R, 50.6, 50.8, 294/55; 15/257.1, 257.2, 257.6, 104.8, 221; 56/328, 332, 329, 333

[56] References Cited
UNITED STATES PATENTS 2,703,251  3/1955  Green .............................. 294/50.8
2,860,360  11/1958  Leavelle ............................. 15/221
3,446,525  5/1969  Jones ................................ 294/19 R
3,606,436  9/1971  Lynch ............................... 294/19 R

*Primary Examiner*—Evon C. Blunk
*Assistant Examiner*—Johnny D. Cherry
*Attorney, Agent, or Firm*—Hubbell, Cohen & Stiefel

[57] ABSTRACT

A disposable device for removing animal feces which is usable with a grass trimmer or other apparatus having a pair of relatively movable blades and means for moving said blades toward and away from each other. The device is cup-like preferably with a flat base and with means for releasably attaching it to one of the blades. Two devices are used together to function as a closable disposable container.

6 Claims, 4 Drawing Figures

APPARATUS FOR REMOVING FECES OF ANIMALS AND METHOD OF MANUFACTURE OF SAID APPARATUS

BACKGROUND OF THE INVENTION

1. Field of the Invention

This invention relates to apparatus for removing animal feces and particularly to disposable apparatus for performing this task. In addition this invention relates to a method of manufacturing said disposable apparatus for removing animal feces.

2. The Prior Art

Apparatus has previously been suggested for removing animal feces from sidewalks, gutters and the like. However, the prior art apparatuses, as exemplified by U.S. Pat. Nos. 3,139,299 and 3,431,008 include collecting means that are not disposable. This presents a problem with respect to cleanliness and requires a constant need of washing the device after use.

Numerous disposable articles have been formed of paper and the like, such as paper cups, U.S. Pat. No. 1,552,524, paper scoops, U.S. Pat. No. 1,330,548 and paper dust pans, U.S. Pat. No. 3,345,670. However, such devices have never been useable for removing animal feces and none of them is suitable for use with a scissors-like grass cutter or the like.

SUMMARY OF THE INVENTION

A pair of cup-like disposable devices are releasably mounted on the blades of a grass trimmer or the like to act as an openable disposable container. Each device is formed from a foldable sheet, preferably selectively precoated with adhesive, which is folded to form the cup-shaped device with a planar base and a pair of upstanding sides joined together at their upper edges, the front edges of said base and sides defining an opening. The sheet is further folded to define a blade receiving pocket beneath the base for releasably mounting the device on one of said blades. Preferably the front edges of said base and sides are in a plane perpendicular to said base.

DETAILED DESCRIPTION OF THE PREFERRED EMBODIMENT

Figure 1:
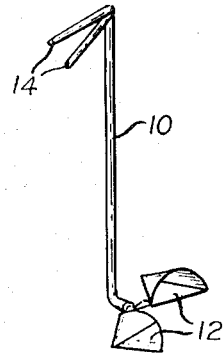
FIG. 1 is a perspective view of a long handled grass trimmer equipped with two disposable feces removing devices of the present invention.

Referring now to the drawings in detail and particularly to FIG. 1 thereof, a long handled grass trimmer 10 of conventional design is shown equipped with two disposable cup-like fecal gathering devices 12 of the present invention. The grass trimmer 10 may be of any suitable scissors-like device, either long or short. However, for ease of use long or high handled grass trimmers, such as that sold by the True Temper Company under the designation True Temper Model L22, are preferred. Such a device has a pair of relatively movable handles 14 which operate a pair of relatively movable blades 16 (see FIG. 2) to move the blades toward and away from one another in a scissors-like action. The devices 12 have a flat bottom and confronting openings and preferably are semi-conical-like in shape. The flat bottoms are provided with pockets 18 for slidably receiving the blades 16 of the grass trimmer 10 therewith to detachably mount the devices 12 on the blades 16 for movement therewith.

Figure 3:
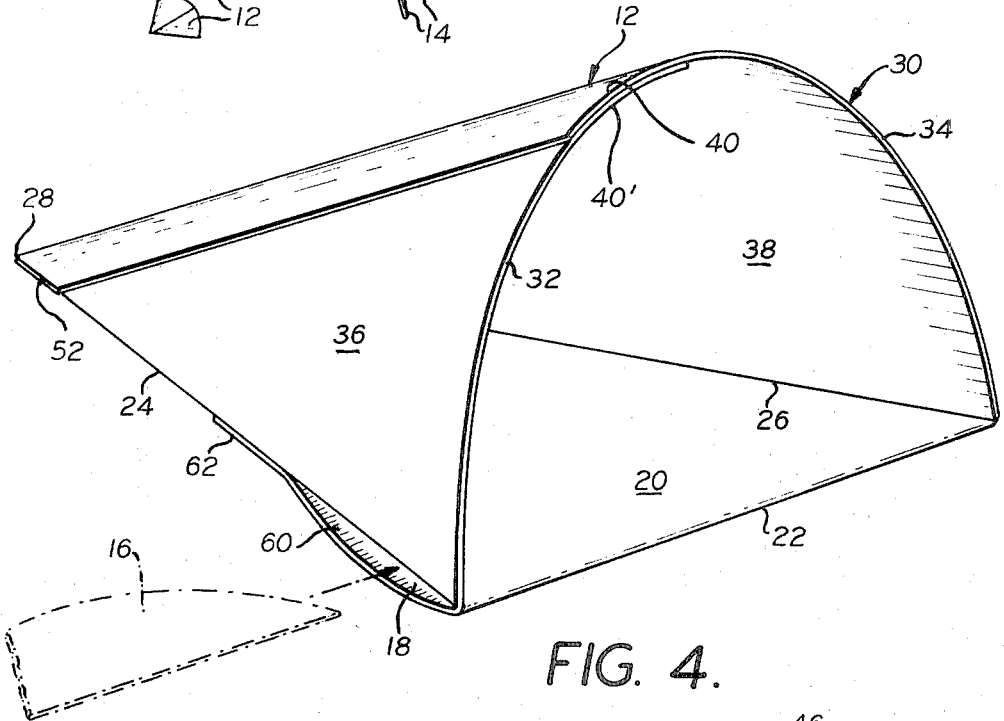
FIG. 3 is a perspective view of the disposable fecal removing device of the present invention shown in condition to receive a blade of a grass trimmer.

One of the cup-like devices 12 is shown in enlarged scale in FIG. 3. The device is provided with a triangular substantially planar base 20 bounded by a front fold line 22 and two side fold lines 24 and 26 which are joined in a manner to be described hereinafter at a rear apex 28. Extending above the front fold line 22 is an arcuate edge 30 which is made up in fact of the front edges 32 and 34 of sides 36 and 38, the latter two being joined at a glued seam 40 running from the top of arcuate edge 30 to the apex 28. The edges 22 and 30 preferably define a plane that is substantially perpendicular to base 20. Thus it will be seen that the device 12 encloses a semi-conical shaped volume which will be employed for the reception of the animal feces.

Figure 4:
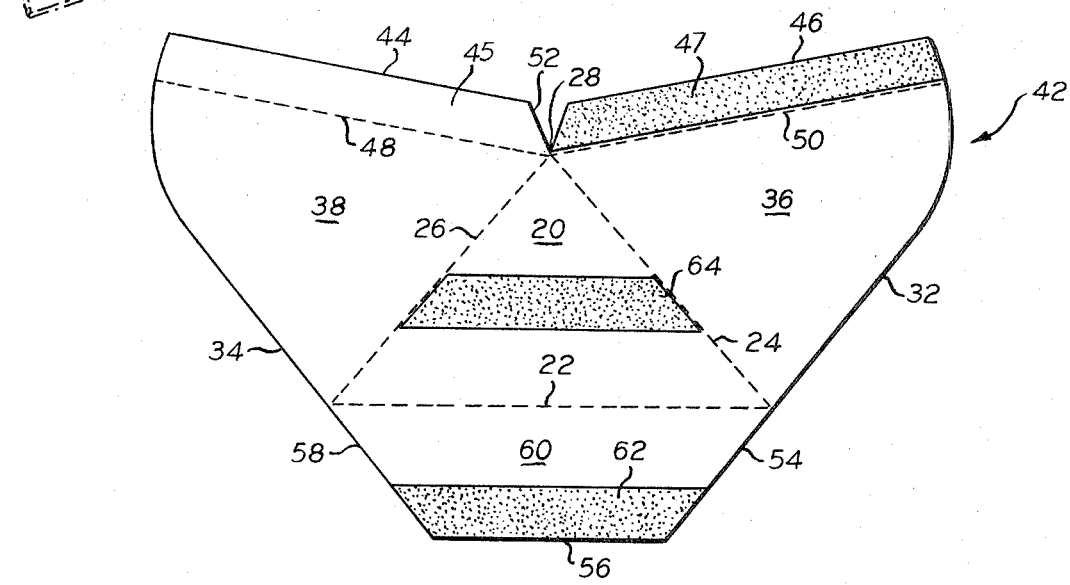
FIG. 4 is a plan view of a paper blank suitable for manufacture into the device of the present invention.

Referring now to FIG. 4, the device 12 is formed out of a unitary substantially trapezoidal sheet of paper or other foldable material 42 having its upper edge portions 44 and 46 preferably at a large oblique angle to one another (although they may be aligned) and forming the outer edges of the glued portions 45 and 47 when the sheet 42 is folded to form the article 12 as will be described hereinafter. Parallel to and spaced from the edges 44 and 46 and bounding the other sides of the glued portions 45 and 47 are a pair of fold lines 48 and 50. The top edges 44 and 46 are interrupted adjacent their point of intersection by a V-shaped cut-out 52 which permits the folding of the glued portions 45 and 47 about their respective fold lines 48 and 50. As can be seen in FIG. 4, the base 20 is defined by equilaterally arranged fold lines 22, 24 and 26. Right side 36 is defined by the fold line 24, the fold line 50 and the front arcuate edge 32. The left side 38 is defined by the fold line 26, the fold line 48 and the arcuate front edge portion 34. The shape of arcuate edges 32 and 34 is such that, preferably, upon assembly as will be described hereinafter, edge 22 and edges 32 and 34 will together define a plane substantially perpendicular to base 20. Sheet 42 is provided downwardly from the terminal edge of front edge 32 with an extension 54 that terminates at the lower edge 56 of the sheet. Edge 34 is provided with an extension 58 which also terminates at the edge 56. The edge extensions 54 and 58, the fold line 22 and the lower edge 56 of sheet 42 thus define a trapezoidal flap 60 having a marginal glued portion 62 adjacent the edge 56. The flap 60 when folded underneath base 20, as will be described, will define the blade receiving pocket 18 of the article 12.

Preferably to form all of the glued seams of the article 12, the confronting surfaces of the seams are both provided with pressure sensitive adhesive. However, it will be obvious to those skilled in the art that a satisfactory seam can be achieved by applying pressure sensitive adhesive to only one of the confronting sides rather than two. Other glues, such as water soluble glues may be used in lieu of pressure sensitive adhesive. Moreover, means may be provided for indicating where glue is to be applied and the glue may be provided and applied by the user himself in assembling the device, pressure sensitive adhesive not being used. However, in the preferred embodiment, as already indicated, opposing surfaces are each provided with pressure sensitive adhesive so that when they are brought into contact they form a firm seam. Thus the surfaces of the flaps adjacent the upper edge of the sheet 42 that will come into confronting relation with one another upon the assembly of the device 42 are each provided with a pressure sensitive adhesive coating as is the lower marginal edge portion 62. To provide for a secure pocket 18 a trapezoidal segment 64 on the lower surface of triangular base 20 spaced from fold line 22 an equal distance to the spacing of portion 62 is also provided with pressure sensitive adhesive. If pressure sensitive adhesive is employed, their surfaces are preferably covered by strippable protective strips such as silicone treated paper.

To assemble article 12 from sheet 42, sheet 42 is first folded along its fold line 22 to bring flap 60 underneath base 20, adhesive portion 62 is pressed into engagement with adhesive portion 64 to form the blade receiving pocket 18 of the article 12. Then the sheet 42 is folded along the fold line 24 to cause the side 36 to be upstanding and then the side 36 is folded along the fold line 50 to expose the adhesive covered under surface of the upper marginal edge portion 47 of the flap 36. Thereafter sheet 42 is folded along its fold line 26 to raise flap 38 and flap 38 is then folded along its fold line 48 to enable the adhesive covered marginal edge portion 47 of flap 38 to be brought into surface-to-surface contact with the flap 45 of side 36 and thereby form seam 40 to complete the semi-conical configuration of the device 12.

As already noted where two confronting adhesive surfaces are brought into engagement to effect a seam or seal, only one of those surfaces need actually be covered with adhesive in order to effect the connection, although both surfaces being adhesively coated is preferred. In addition, if desired, rather than providing preglued surfaces, indicia can be provided on the sheet 42 to instruct the user where to apply his own glue which may then be employed to effect the seal.

Figure 2:
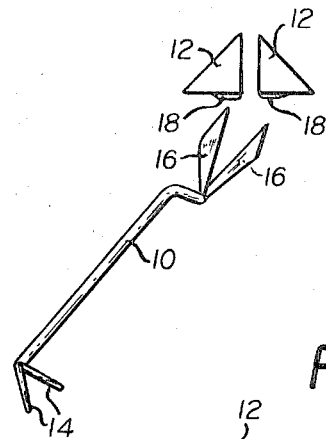
FIG. 2 is a perspective view of the long handled grass trimmer of FIG. 1 detached from the animal feces removing devices of the present invention.

Sheets 42 can be marketed in a pad thereof, each being tearable from the pad for use in connection with a shear-like device of the type of the high handle shear 10 of FIGS. 1 and 2.

In use, two sheets 42 may be torn from a pad thereof (or removed from a box, or the like), their pre-glued surfaces may be exposed if covered as by silicone treated paper or the like, and they may be folded into two devices 12 in accordance with the previously described method. The devices 12 may then be slid onto the two blades 16 of the grass cutter 10 so that their openings, that is their arcuate edges 30, are in confronting relationship with one another. With the two articles 12 securely but detachably mounted on the blades 16 of the device 10, when there is animal feces to remove from the street, the roadway, or the lawn, the device 10 may be positioned so that the blade opening between the confronting edges 22 envelops the fecal material. The blades 16 of the device 10 are pressed securely against the sidewalk or lawn as the case may be and the handles 14 are then operated to bring the blades 16 into overlying relation with one another. This movement of the blades will cause the articles 12 to move toward one another and slide under the fecal material and thereby enclose it within the two now engaging devices 12. The front planes of the two devices merge into one and the fecal material is thus trapped. The grass trimmer may now be taken to a trashcan or to a toilet at which point the articles 12 and the fecal material enclosed therein may be easily removed without the necessity of handling the animal feces. By utilizing the disposable devices 12 there will be no contamination of the blades 16 which are preferably completely enclosed within the flaps 18 of the devices 12 to protect them from the fecal material.

While I have herein shown and described the preferred form of the present invention, it will be understood that various changes and modifications may be made therein within the scope of the appended claims without departing from the spirit and scope of this invention.

What is claimed is:

1. In combination with apparatus including a pair of blades, and means for moving said blades toward and away from one another,
   a pair of disposable cup-like devices, one for each blade, each of said cup-like devices including a pocket in which one of said blades is slidably disposed, whereby to releasably attach said device to its associated blade with the opening of each cup-like device confronting the opening of the other.

2. The combination of claim 1, wherein said cup-like devices each have a substantially planar base.

3. The combination of claim 2, wherein said pockets are on said planar base.

4. The combination of claim 3, wherein the edges of said cup-like devices defining said openings lie substantially in planes perpendicular to their respective bases, whereby when said blades are moved toward each other said edges of said two devices occupy substantially the same plane.

5. A disposable animal feces removing device for use with an apparatus having a pair of relatively movable blades and means for moving said blades toward and away from each other, said device comprising a substantially planar base and a pair of upstanding sides defining a front opening, and a pocket on said base for slidably receiving one of said blades for detachably connecting said device to one of said blades.

6. The disposable device of claim 5, wherein said edges forming said front opening lie in a plane substantially perpendicular to said base.

* * * * *